United States Patent

Van Du et al.

[11] Patent Number: 5,977,711
[45] Date of Patent: Nov. 2, 1999

[54] METHOD AND SYSTEM FOR OPTIMIZING CATHODE OUTPUT FOR AGING A CATHODE RAY TUBE DURING MANUFACTURE

[75] Inventors: Vincent Van Du; Hiroyuki Nakazono; Alexander McElroy, all of San Diego, Calif.

[73] Assignees: Sony Corporation, Tokyo, Japan; Sony Electronics, Inc., Park Ridge, N.J.

[21] Appl. No.: 08/958,096

[22] Filed: Oct. 27, 1997

[51] Int. Cl.$^6$ .............................. H01J 9/42; H01J 9/49; H04N 17/00; G09G 5/10

[52] U.S. Cl. .............................. 315/30; 315/10; 345/207; 345/11; 345/12; 345/20; 348/380; 445/6; 445/62

[58] Field of Search ................... 345/11, 12, 20, 345/207; 315/9, 10, 13.1, 30; 348/178, 190, 379, 380; 445/6, 62

[56] References Cited

U.S. PATENT DOCUMENTS

| | | | |
|---|---|---|---|
| 4,386,345 | 5/1983 | Narveson et al. | 345/22 |
| 4,706,108 | 11/1987 | Kumagai et al. | 348/178 |
| 5,099,326 | 3/1992 | Hakamada et al. | 348/190 |
| 5,257,096 | 10/1993 | Oshima | 348/657 |
| 5,371,537 | 12/1994 | Bohan et al. | 348/181 |
| 5,479,186 | 12/1995 | McManus et al. | 345/11 |
| 5,512,961 | 4/1996 | Cappels, Sr. | 348/658 |
| 5,677,732 | 10/1997 | Moon | 348/190 |
| 5,790,189 | 8/1998 | Moon | 348/189 |
| 5,801,768 | 9/1998 | Sudo et al. | 348/191 |
| 5,821,917 | 10/1998 | Cappels | 345/150 |

*Primary Examiner*—Edward P. Westin
*Assistant Examiner*—Shane R. Gardner
*Attorney, Agent, or Firm*—Blakely, Sokoloff, Taylor & Zafman LLP

[57] ABSTRACT

The present invention relates to a method and system for optimizing the output of at least two electron guns in a cathode ray tube for aging the cathode ray tube during manufacture. The system comprises at least two electron guns located in the cathode ray tube and a memory configured to store an offset value that is representative of a difference between a maximum output level and a detected output level for each of the electron guns. The system further comprises a processor coupled to the memory. The processor generates a first scaled signal by adding a first signal representative of an input voltage corresponding to the detected output level of the first electron gun and an offset signal representative of the offset value, and a second scaled signal by adding a second signal representative of an input voltage corresponding to the detected output level of the second electron gun and the offset signal. A first summing circuit is coupled between the processor and the first electron gun, which combines a first control signal and the first scaled signal to provide a first aging signal to the first electron gun. A second summing circuit is coupled between the processor and the second electron gun, which combines a second control signal and the second scaled signal to provide a second aging signal to the second electron gun. The optimizing technique may also be applied to a third electron gun.

13 Claims, 4 Drawing Sheets

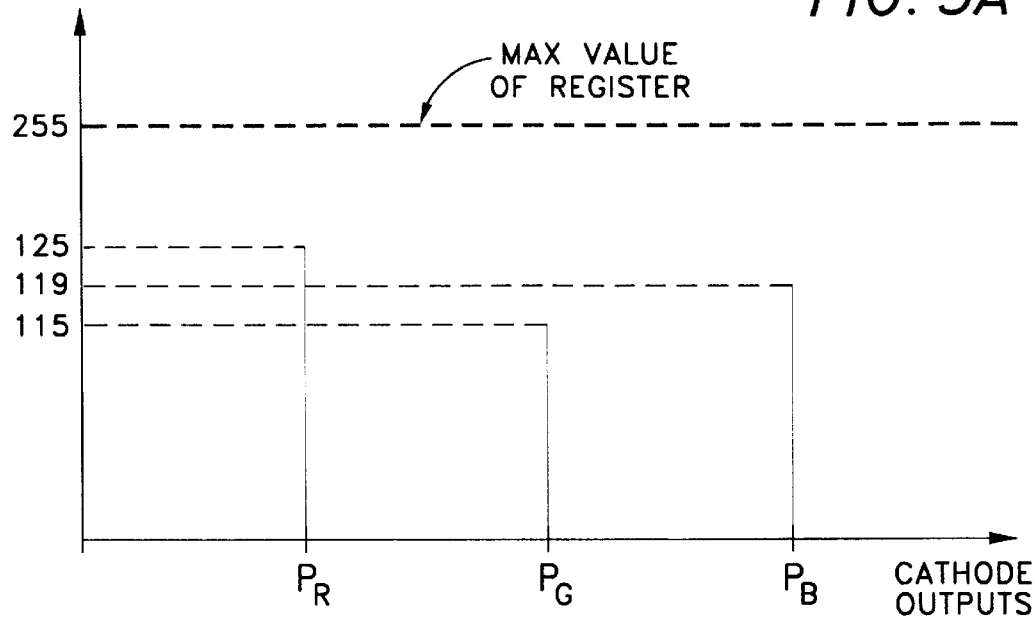
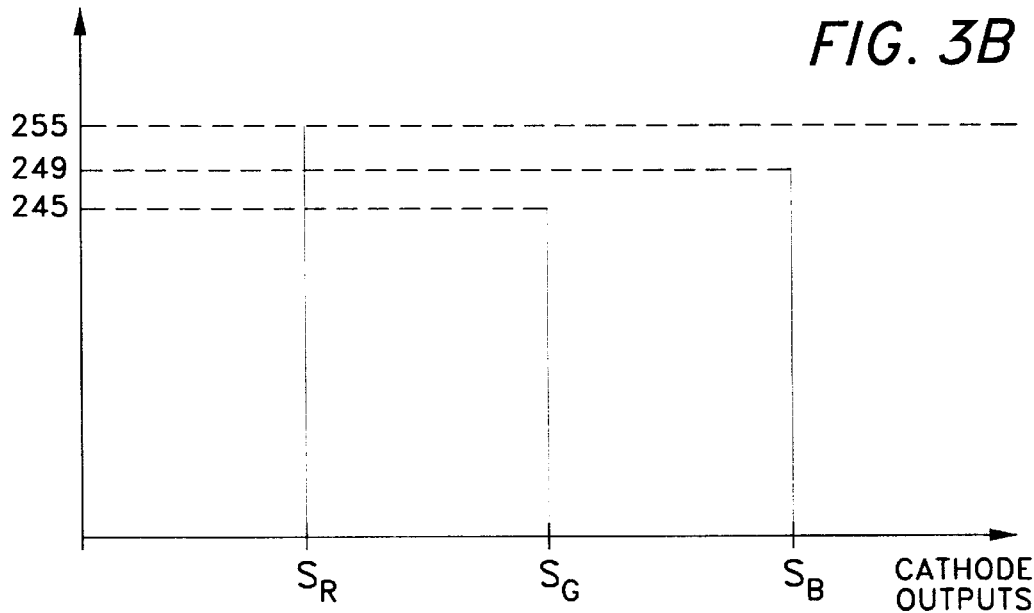

METHOD AND SYSTEM FOR OPTIMIZING CATHODE OUTPUT FOR AGING A CATHODE RAY TUBE DURING MANUFACTURE

BACKGROUND OF THE INVENTION

1. Field of the Invention

The present invention relates in general to monitors, and more particularly, to a method and apparatus for providing cathode output scaling so as to provide optimization of the cathode output.

2. Description of the Related Art

Cathode ray tubes ("CRT") are typically employed in electronic display systems, such as a television receiver or a display apparatus including a CRT numerical display. Each color CRT consists of three electron guns (a red, a green and a blue electron gun) and a phosphor screen that is located inside an evacuated glass envelope. Each electron gun generates a beam of electrons that is accelerated towards the screen by a positive anode voltage.

In CRTs, temperature drifts within the evaluated glass envelope result in image luminance distortion or the alteration of the white balance. Luminance indicates the amount of light intensity which is perceived by the eye as brightness, while the control of luminance is termed "white balance" since white light may be considered and provided as a mixture of the red, green, and blue primary colors in the proper proportions.

To reduce temperature drift, the CRTs are typically subjected to a process known as "aging" during manufacture. This process involves the warming up of cathode ray tubes ("CRT") to facilitate testing of circuitry and adjustment of various display parameters such as color convergence and picture geometry. Conventional aging techniques typically involve applying a single input voltage to each of the three electron guns to cause each electron gun to generate the corresponding luminance. However, since each electron gun generates a different color, each of the electron guns also operates to provide an optimum output at a different input voltage. This input voltage varies from one electron gun to another. Thus, although one of the three electron guns may be operating at a maximum level, the remaining two electron guns are not.

Accordingly, there is a need in the technology for a method and apparatus for providing suitable input voltages to each cathode in a cathode ray tube so as to provide optimization of the cathode output for each electron gun in a cathode ray tube for the aging process during manufacture.

BRIEF SUMMARY OF THE INVENTION

The present invention relates to a method and system for optimizing the output of at least two electron guns in a cathode ray tube for aging the cathode ray tube during manufacture. The system comprises at least two electron guns located in the cathode ray tube and a memory configured to store an offset value that is representative of a difference between a maximum output level and a detected output level for each of the electron guns. The system further comprises a processor coupled to the memory. The processor generates a first scaled signal by adding a first signal representative of an input voltage corresponding to the detected output level of the first electron gun and an offset signal representative of the offset value, and a second scaled signal by adding a second signal representative of an input voltage corresponding to the detected output level of the second electron gun and the offset signal. A first summing circuit is coupled between the processor and the first electron gun, which combines a first control signal and the first scaled signal to provide a first aging signal to the first electron gun. A second summing circuit is coupled between the processor and the second electron gun, which combines a second control signal and the second scaled signal to provide a second aging signal to the second electron gun. The optimizing technique may also be applied to a third electron gun.

BRIEF DESCRIPTION OF THE DRAWINGS

FIG. 3A illustrates examples of the detected outputs of the electron guns $132a$, $132b$ and $132c$.

FIG. 3B illustrates the adjusted or scaled values of the detect outputs of the electron guns $132a$, $132b$, and $132c$.

DETAILED DESCRIPTION OF THE INVENTION

The present invention is an apparatus and method for optimizing the outputs of two or more electron guns in a cathode ray tube, so as to provide optimization of the electron gun outputs for an aging process during manufacture.

Figure 1:
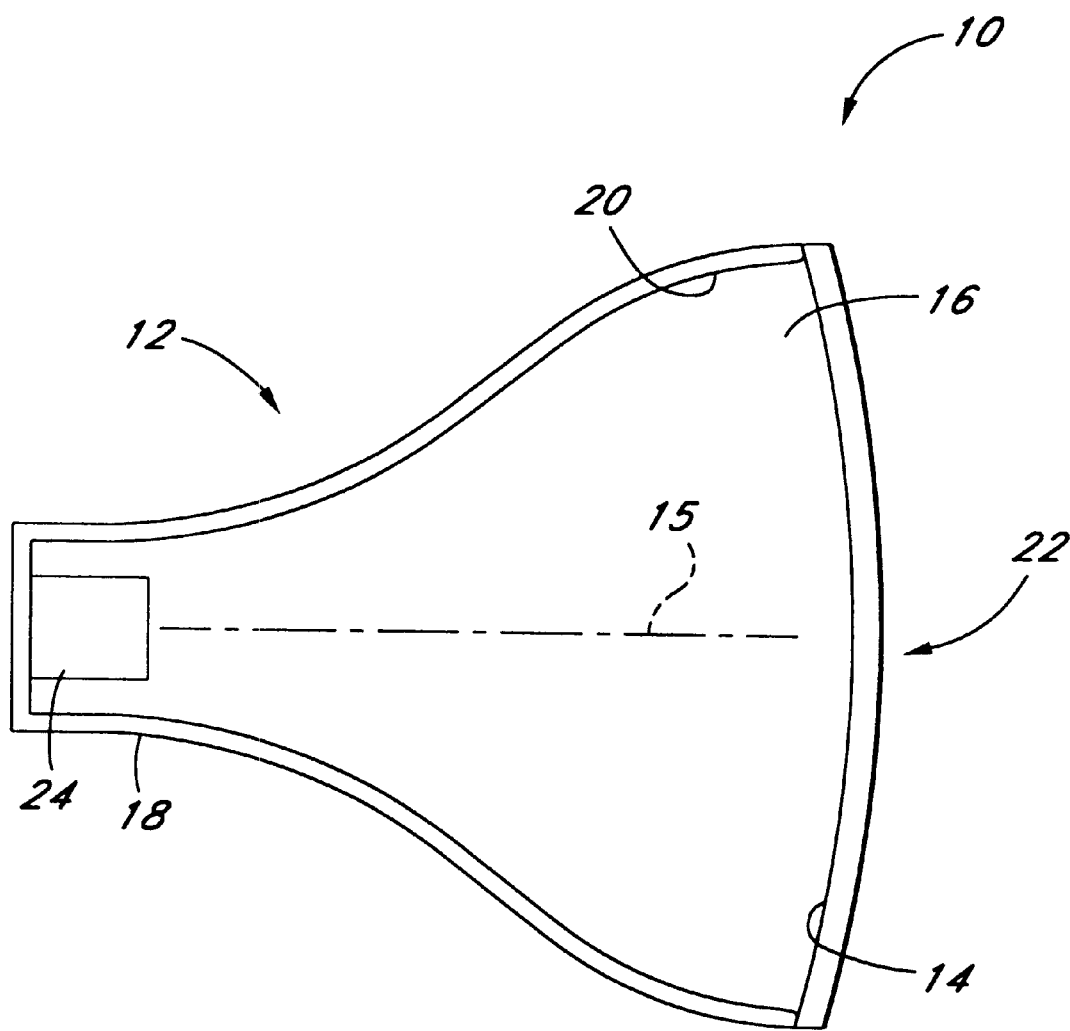
FIG. 1 is a cross sectional view of a conventional cathode ray tube.

As shown in FIG. 1, the CRT 10 consists of electron guns 24 and a phosphor screen 14 that is located inside an evacuated glass envelope 16. The narrow neck 18 of the CRT 10 contains the electron guns 24, each of which generates a beam of electrons 15. The beam is accelerated towards the screen 14 by a positive anode voltage. The anode 20 is a conductive coating on the inside surface of the wide glass bell portion 12 of the CRT 10. To form the screen, the inside of the faceplate 22 is coated with a luminescent material that produces light when excited by electrons in the beam 15. For color picture tubes, the screen 14 is formed with dot trios or vertical lines of red, green, and blue phosphors. In such color picture tubes, there are three electron beams, one for each color phosphor. Each of the three electron beams is emitted by a separate cathode.

Figure 2:
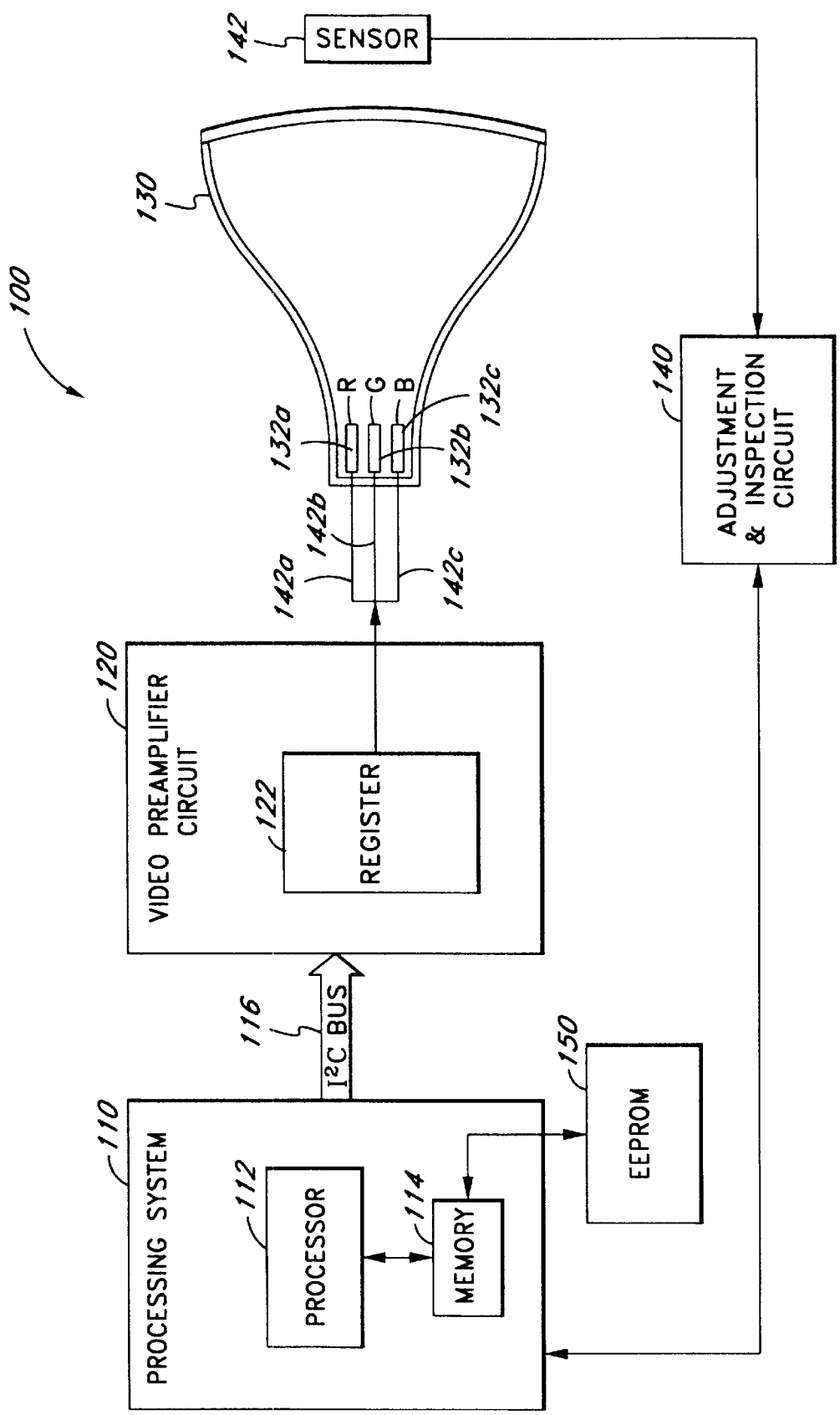
FIG. 2 is a block diagram of one embodiment of a calibration system provided in accordance with the principles of the present invention.

The present invention first determines the input voltage corresponding to the maximum output for each cathode. The appropriate values are stored in memory in the display system for use during operation of the CRT. FIG. 2 illustrates a calibration system 100 that performs the cathode output determination process in accordance with the principles of the present invention. The calibration system 100 comprises a processing system 110, a video preamplifier circuit or video processing circuit 120 that includes a register block 122, a CRT 130 (such as the CRT 10) that includes a red electron gun $132a$, a green electron gun $132b$, and a blue electron gun $132c$, an adjustment and inspection circuit 140 that includes a sensor 142, and a memory module 150 such as an erasable electrically programmable read only memory (EEPROM). In one embodiment, the processing system 110 is a controller. In another embodiment, the processing system 110 comprises a processor 112 and memory 114 such as a random access memory (RAM). Examples of the processor 112 include the Pentium™ and the Pentium Pro™ processors. The processing system 110 is coupled to the video preamplifier circuit 120 via signal line 116. In one embodiment, the signal line 116 is an inter-integrated circuit (I²C) bus. The register block 122 is coupled to each of the electron gun 132a, 132b, and 132c via a corresponding signal line 142a, 142b, and 142c. In one embodiment, the video preamplifier circuit 120 is the RGB Video Preamplifier as marketed by Sony Corp. under the part designation CXA2055P. The processing system 110 issues control and data signals to the video preamplifier circuit 120 to control the output of each electron gun 132a, 132b, and 132c.

The processor 112 generates digital control signals that are provided to the video preamplifier circuit 120. The digital control signals are stored in the register block 122 subsequently provided as analog luminance signals to the respective electron guns 132a, 132b, and 132c. In particular, the control signals include values for operating each electron gun 132a, 132b, and/or 132c at predetermined luminance levels, as described in detail in the following sections.

The sensor 142 detects the color temperature corresponding to the output generated by each electron gun 132a, 132b, and 132c. As is known by one of ordinary skill in the technology, the color temperature of the output of each electron gun 132a, 132b, and 132c corresponds to the magnitude of the output of each electron gun 132a, 132b, and 132c. The detected temperatures are provided to the adjustment and inspection circuit 140, which subsequently provides values corresponding to the detected temperatures to the processing system 110. The processing system 110 stores the values of the detected temperatures in the memory module 150. In this manner, the electron gun 132a, 132b, or 132c with the most dominant output or the highest output value may be identified. In addition, the outputs of the remaining electron guns may be obtained so that optimizing, as described in the following sections, may be provided. In one embodiment, the adjustment and inspection circuit 140 is the Adjustment and Inspection display as marketed by Sony Corp. under the part designation CPD-100GS. In another embodiment, the process for detecting the outputs of the electron guns 132a, 132b and 132c may be performed using the Adjustment/Inspection Standard TS-6999-919M-10.

Once the electron gun 132a, 132b, or 132c with the dominant output has been identified, the corresponding value of its output is stored in memory 150. The corresponding values of the remaining electron guns are also detected and stored in memory 150. FIG. 3A illustrates examples of the detected outputs of the electron guns 132a, 132b, and 132c. In this example, the output of the red electron gun 132a provides an output $P_R$ that is the maximum output, and is recorded in an 8 bit register with a value of 125. The output of the green electron gun 132b provides an output $P_G$ with a value of 115, while that of the blue electron gun 132c provides an output $P_B$ with a value of 119. Since the maximum value for an 8 bit register is 255, the present invention adjusts the output value of the red electron gun 132a to the maximum value of the 8 bit register, i.e., 255. This is accomplished by adding an offset of D=255−actual output value of the electron gun 132a, 132b, or 132c providing the highest output. In the present example, D=255−125=130. As a result, the adjusted outputs $S_R$, $S_G$, and $S_B$ of the respective electron guns 132a, 132b, and 132c will be as follows:

$$S_R = 125 + D$$
$$= 125 + (255 - 125)$$
$$= 255;$$
$$S_G = 115 + D$$
$$= 115 + (255 - 125)$$
$$= 245;$$
$$S_B = 119 + D$$
$$= 119 + (255 - 125)$$
$$= 249.$$

FIG. 3B illustrates the adjusted or scaled values of the detected outputs of the electron guns 132a, 132b, and 132c. The adjusted or scaled output values of the electron guns 132a, 132b, and 132c are stored in memory 150. Once stored, the adjustment and inspection circuit 140, along with the sensor 142 may be disconnected from the processing system 110.

Figure 4:
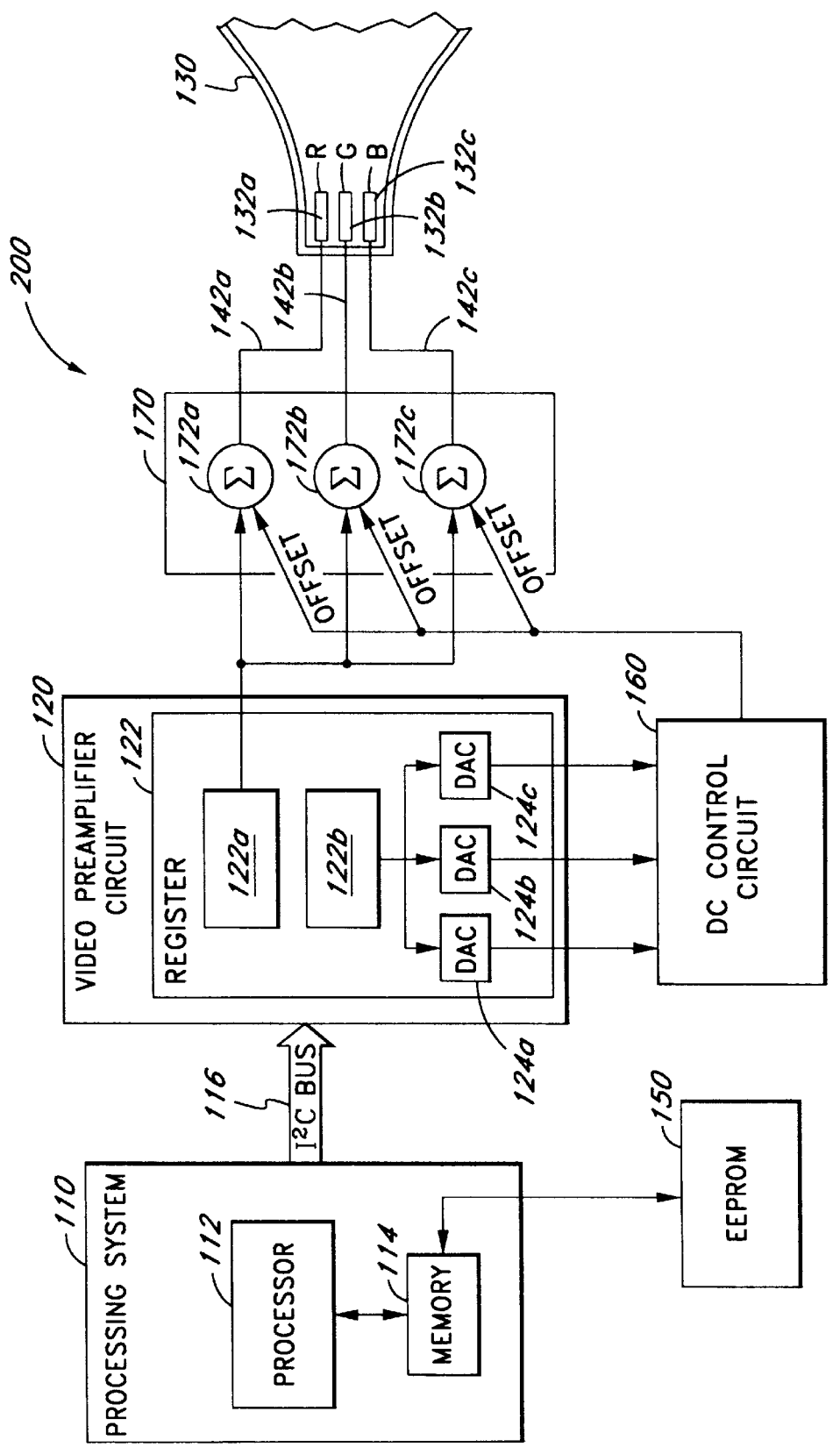
FIG. 4 illustrates a display system 200 that implements the cathode output scaling process of the present invention.

FIG. 4 illustrates a display system 200 that implements the cathode output optimizing process of the present invention. The display system 200 comprises the processing system 110, the video preamplifier circuit 120, the CRT 130, the memory module 150, a direct current (DC) control circuit 160 and a summing circuit 170. During the aging process, the processor 112 first retrieves the scaled output values from the memory 150. It then issues control and data signals to the video preamplifier circuit 120 via signal line 116. In particular, the processor 112 issues a first set control signals to fire the electron guns 132a, 132b, 132c at their normal output values. In addition, a second control signal is provided to the video preamplifier circuit 120 to provide the scaled output values to a DC control cutoff circuit 160. The values corresponding to the control and data signals are stored in register block 122. In particular, the value of the first set control signals is stored in a first register location 122a, while the value of the second set of control signals are stored in a second register location 122b. The value of the first register location 122a are provided as an analog control signals to each summer 172a, 172b, and 172c, while the values stored in the second register location 122b are provided to each DAC 124a, 124b, and 124c, which converts the digital scaled output values stored in the second register location 122b to an analog offset signal, that is subsequently provided to the DC control cutoff circuit 160. The DC control cutoff circuit 160 amplifies the output of the DACs 124a, 124b, and 124c to provide the scaled output values to each summer 172a, 172b, and 172c in the summing circuit 170. Each summer 172a, 172b, and 172c adds the scaled values to the normal output values of the electron guns 132a, 132b, and 132c and provides the resulting aging signal for controlling the output of the electron guns 132a, 132b, and 132c. As a result, the aging output of the red electron gun 132a will be provided at a maximum value, while the aging outputs of the remaining two electron guns 132b and 132c will be scaled accordingly.

The present invention thus provides a method and apparatus for providing suitable input voltages to each cathode in a cathode ray tube so as to provide optimization of the cathode output for each electron gun in a cathode ray tube during an aging process.

The present invention may be embodied in other specific forms without departing from its spirit or essential characteristics. The described embodiments are to be considered in all respects only as illustrative and not restrictive. The scope of the invention is, therefore, indicated by the appended claims rather than the foregoing description. All changes which come within the meaning and range of equivalency of the claims are to be embraced within their scope.

What is claimed is:

1. A system for aging a cathode ray tube during manufacture, comprising:

a first electron gun located in the cathode ray tube;

a second electron gun located in the cathode ray tube;

a memory configured to store a first detected output level value of the first electron gun, a second detected output level value of the second electron gun, and an offset value, wherein the offset value is the smaller of a first value and a second value, where the first value is representative of a difference between a maximum output level value and the first detected output level value, and the second value is representative of a difference between the maximum output level value and the second detected output level value;

a processor coupled to the memory, said processor generating a first scaled value by adding the first detected output level value and the offset value, and a second scaled value by adding the second detected output level value and the offset value;

a first summing circuit coupled to the processor and the first electron gun, said first summing circuit providing a first aging signal to the first electron gun based on a first control value and the first scaled value; and a second summing circuit coupled to the processor and the second electron gun, said second summing circuit providing a second aging signal to the second electron gun based on a second control value and the second scaled value.

2. The system of claim 1, further comprising:

a third electron gun located in the cathode ray tube;

wherein said memory is configured to store a third detected output level value of the third electron gun, and wherein the offset value is the smaller of the first values, the second value, and a third value, where the third value is representative of a difference between the maximum output level value and the third detected output level value;

wherein said processor generates a third scaled value by adding the third detect output level value and the offset signal;

a third summing circuit coupled to the processor and the third electron gun, said third summing circuit providing a third aging signal to the third electron gun based on a third control value and the third scaled value.

3. The system of claim 1, further comprising a control circuit responsive to said processor and coupled to said first summing circuit and said second summing circuit, said control circuit generating a first scaled signal based on the first scaled value from said processor, and a second scaled signal based on the second scaled value from said processor.

4. The system of claim 3, further comprising a video processing circuit coupled between said first and second summing circuits and said processor, said video processing circuit generating a first control signal based on the first control valued from said processor and a second control signal based on the second control value from said processor.

5. The system of claim 4, wherein said first summing circuit sums said first control signal and said first scaled signal and provides a resulting first analog aging signal as the first aging signal, and said second summit circuit sums said second control signal and said second scaled signal and provides a resulting second analog aging signal as the second aging signal.

6. The system of claim 1, further comprising a sensor that detects a first color temperature corresponding to a first detected output level of the first electron gun and a second color temperature corresponding to a second detected output level of the second electron gun, and an adjustment circuit coupled between said sensor and said processor, said adjustment circuit determining the first detected output level value corresponding to said first color temperature and the second detected output level value corresponding to said second color temperature, said adjustment circuit providing said first detected output level value of the first electron gun and said second detected output level value of the second electron gun to said processor.

7. The system of claim 1, wherein the memory is an erasable electrically programmable read only memory.

8. A method for aging a cathode ray tube during manufacture, comprising:

storing a first detected output level value of a first electron gun;

storing a second detected output level value of a second electron gun;

storing an offset value, wherein the offset value is the smaller of a first value and a second value, where the first value is representative of a difference between a maximum output level and the first detected output level value, and the second value is representative of a difference between the maximum output level value and the second detected output level value;

generating a first scaled value by adding the first detected output level value and the offset value;

generating a second scaled value by adding a the second detected output level value and the offset value;

providing a first aging signal to the first electron gun based on a first control value and the first scaled value; and providing a second aging signal to the second electron gun based on a second control value and the second scaled value.

9. The method of claim 8, further comprising:

storing a third detected output level value of a third electron gun;

wherein in storing the offset value, the offset value further is the smaller the first value, the second value, and a third value, where the third value is representative of a difference between the maximum output level value and the third detected output level value;

generating a third scaled value by adding the third detected output level value and the offset value;

providing a third aging signal to the third electron gun based on a third control value and the third scaled value.

10. The method of claim 8, further comprising:

detecting a first color temperature corresponding to a first detected output level of the first electron gun;

detecting a second color temperature corresponding to a second detected output level of the second electron gun;

determining the first detected output level value corresponding to said first color temperature;

determining the second detected output level value corresponding to said second color temperature.

11. The method of claim 8, further comprising generating a first scaled signal based on said first scaled value, and generating a second scaled signal based on said second scaled value.

12. The method of claim 11, further comprising generating a first control signal based on said first control value, and generating a second control signal based on said second control value.

13. The method of claim 12, wherein in combining, said first control signal and said first scaled signal are combined to provide a resulting first analog aging signal as the first aging signal, and said second control signal and said scaled second signal are combined to provide a resulting second analog aging signal as the second aging signal.

* * * * *

UNITED STATES PATENT AND TRADEMARK OFFICE
CERTIFICATE OF CORRECTION

PATENT NO.     : 5,977,711
DATED          : November 2, 1999
INVENTOR(S)    : Van Du et al.

It is certified that error appears in the above-identified patent and that said Letters Patent is hereby corrected as shown below:

In column 1 at line 17 delete "green" and insert --green,--

In column 5 at line 42 delete "values," and insert --value,--

In column 5 at line 47 delete "detect" and insert --detected--

In column 6 at line 30 insert --value-- after "level"

In column 6 at line 36 delete "adding a the" and insert --adding the--

In column 6 at line 48 insert --of-- between "smaller" and "the"

Signed and Sealed this

Third Day of April, 2001

Attest:

NICHOLAS P. GODICI

Attesting Officer     Acting Director of the United States Patent and Trademark Office